United States Patent
Feyh et al.

(10) Patent No.: US 10,298,858 B2
(45) Date of Patent: May 21, 2019

(54) METHODS TO COMBINE RADIATION-BASED TEMPERATURE SENSOR AND INERTIAL SENSOR AND/OR CAMERA OUTPUT IN A HANDHELD/MOBILE DEVICE

(71) Applicant: Robert Bosch GmbH, Stuttgart (DE)

(72) Inventors: Ando Feyh, Palo Alto, CA (US); Sam Kavusi, Menlo Park, CA (US); Johan Vanderhaegen, Palo Alto, CA (US); Gary Yama, Mountain View, CA (US); Fabian Purkl, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 547 days.

(21) Appl. No.: 14/092,152

(22) Filed: Nov. 27, 2013

(65) Prior Publication Data
US 2014/0152772 A1    Jun. 5, 2014

Related U.S. Application Data

(60) Provisional application No. 61/732,085, filed on Nov. 30, 2012.

(51) Int. Cl.
*H04N 7/18*    (2006.01)
*H04N 5/33*    (2006.01)
(Continued)

(52) U.S. Cl.
CPC ............... *H04N 5/33* (2013.01); *G01J 5/025* (2013.01); *G01J 5/0265* (2013.01); *G01J 5/089* (2013.01);
(Continued)

(58) Field of Classification Search
CPC ... H04N 5/332; H04N 5/33; G01J 2005/0077; G06T 2207/10048
See application file for complete search history.

(56) References Cited

U.S. PATENT DOCUMENTS 6,442,419 B1 *  8/2002  Chu ....................... A61B 5/015
                                                         250/316.1
7,968,845 B1    6/2011  Wagner
                        (Continued)

OTHER PUBLICATIONS

B. D. Lucas and T. Kanade (1981), An iterative image registration technique with an application to stereo vision. Proceedings of Imaging Understanding Workshop, pp. 121-130.
(Continued)

*Primary Examiner* — Rebecca A Volentine
(74) *Attorney, Agent, or Firm* — Maginot Moore & Beck LLP

(57) ABSTRACT

A device for generating thermal images includes a low resolution infrared (IR) sensor supported within a housing and having a field of view. The IR sensor is configured to generate thermal images of objects within the field of view having a first resolution. A spatial information sensor supported within the housing is configured to determine a position for each of the thermal images generated by the IR sensor. A processing unit supported within the housing is configured to receive the thermal images and to combine the thermal images based on the determined positions of the thermal images to produce a combined thermal image having a second resolution that is greater than the first resolution.

3 Claims, 3 Drawing Sheets

(51) Int. Cl.
*G01J 5/08* (2006.01)
*G01J 5/02* (2006.01)
*H04N 5/225* (2006.01)
*H04N 5/232* (2006.01)
*H04N 13/02* (2006.01)

(52) U.S. Cl.
CPC ........... *G01J 5/0831* (2013.01); *G01J 5/0859* (2013.01); *H04N 5/2258* (2013.01); *H04N 5/23232* (2013.01); *H04N 5/23258* (2013.01); *H04N 5/332* (2013.01); *H04N 13/025* (2013.01)

(56) References Cited

U.S. PATENT DOCUMENTS

| | | | | |
|---|---|---|---|---|
| 8,849,630 | B2* | 9/2014 | Amemiya | G06F 1/206 703/14 |
| 2001/0046316 | A1* | 11/2001 | Miyano | A61B 5/0064 382/154 |
| 2005/0152447 | A1* | 7/2005 | Jouppi | G06K 9/00255 375/240.01 |
| 2005/0259849 | A1* | 11/2005 | Pavlidis | A61B 5/015 382/118 |
| 2006/0072109 | A1* | 4/2006 | Bodkin | G01J 3/02 356/328 |
| 2007/0014439 | A1* | 1/2007 | Ando | G06K 9/00771 382/118 |
| 2008/0144885 | A1* | 6/2008 | Zucherman | G06K 9/3241 382/103 |
| 2008/0180351 | A1* | 7/2008 | He | G01C 23/00 345/1.1 |
| 2008/0211916 | A1* | 9/2008 | Ono | G08B 13/19608 348/164 |
| 2009/0018414 | A1* | 1/2009 | Toofan | A61B 5/0059 600/310 |
| 2009/0095912 | A1* | 4/2009 | Slinger | G01T 1/295 250/363.06 |
| 2009/0294666 | A1* | 12/2009 | Hargel | G01J 5/0014 250/330 |
| 2010/0127171 | A1* | 5/2010 | Jonsson | H04N 5/332 250/330 |
| 2010/0321501 | A1* | 12/2010 | Arndt | H04N 5/2252 348/162 |
| 2011/0096148 | A1* | 4/2011 | Stratmann | G01J 5/02 348/46 |
| 2011/0122251 | A1* | 5/2011 | Schmidt | G06K 9/2018 348/164 |
| 2011/0299752 | A1* | 12/2011 | Sun | G06K 9/2018 382/131 |
| 2012/0253201 | A1* | 10/2012 | Reinhold | A61B 5/1113 600/473 |
| 2013/0162835 | A1* | 6/2013 | Forland | H04N 5/332 348/164 |
| 2013/0182890 | A1* | 7/2013 | Shehata | G06T 7/0008 382/103 |
| 2013/0188058 | A1* | 7/2013 | Nguyen | G01J 5/02 348/164 |
| 2013/0335550 | A1* | 12/2013 | Rochenski | G08B 17/125 348/82 |
| 2014/0007224 | A1* | 1/2014 | Lu | H04L 9/3231 726/19 |
| 2014/0036068 | A1* | 2/2014 | Nguyen | G01J 5/12 348/135 |

OTHER PUBLICATIONS

Ting Chen. "Interpolation using a Threshold-based variable number of gradients" (tingchen-Interpolation.PDF—printout of http://scien.stanford.edu/pages/labsite/1999/psych221/projects/99/tingchen/algodep/vargra.html).

Sung Cheol Park; Min Kyu Park; Moon Gi Kang; , "Super-resolution image reconstruction: a technical overview," Signal Processing Magazine, IEEE , vol. 20, No. 3, pp. 21-36, May 2003.

International Search Report and Written Opinion corresponding to PCT Application No. PCT/US2013/072321, dated Feb. 27, 2014 (8 pages).

* cited by examiner

METHODS TO COMBINE RADIATION-BASED TEMPERATURE SENSOR AND INERTIAL SENSOR AND/OR CAMERA OUTPUT IN A HANDHELD/MOBILE DEVICE

CROSS-REFERENCE TO RELATED APPLICATIONS

This application claims priority to U.S. Provisional Application Ser. No. 61/732,085 entitled "METHODS TO COMBINE RADIATION-BASED TEMPERATURE SENSOR AND INERTIAL SENSOR OR CAMERA OUTPUT IN A HANDHELD/MOBILE DEVICE" by Feyh et al., filed Nov. 30, 2012, the disclosure of which is hereby incorporated herein by reference in its entirety.

TECHNICAL FIELD

This disclosure is related generally to radiation-based thermal imaging sensors and particularly to methods for combining the thermal data from such thermal imaging sensors with camera output.

BACKGROUND

In general, infrared (IR) imaging devices, such as IR cameras, are configured to produce images that graphically depict the amount of infrared radiation that is emitted or reflected by objects that are in the view of the camera. Since infrared radiation is emitted by all objects according to the black body radiation law, IR imaging devices have found uses in a wide variety of fields where traditional visible spectrum cameras will not suffice. Examples include firefighting, building maintenance, flame analysis, gas monitoring, semiconductor inspection, industrial machine vision, and even paranormal investigating.

While IR cameras are useful for capturing infrared images, these devices are usually rather large in size and relatively expensive to own. The large size is due to the nature of IR cameras which have imaging sensors with pixel sizes that are comparable to the wave-length of the IR radiation, e.g. 15-20 μm. Therefore, a high resolution camera can require approximately a 10 mm² to 100 mm² footprint just to accommodate the imager. IR cameras also require a lens to focus the infrared radiation onto the pixels. Lenses for IR cameras are expensive and also add to the size of the device.

DRAWINGS

Figure 5:
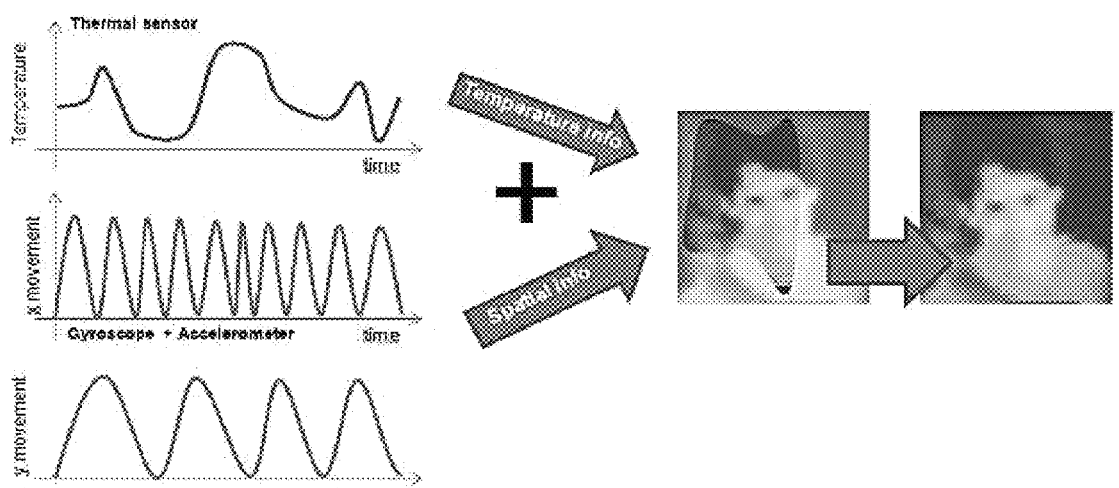

FIG. 5 indicates the image fusion of temperature signal and inertial signal.

DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

The present disclosure is directed to a device and method for producing thermal images that utilizes a low resolution IR sensor incorporated into a smartphone, tablet, or other type of mobile device. The low resolution IR sensor is used in conjunction with other sensors that are commonly integrated into these devices to enable these devices to produce large area thermal imaging and high resolution thermal images similar to an IR camera without the use of an actual IR imager.

According to one embodiment, a device for generating thermal images comprises a portable, handheld device housing. A low resolution infrared (IR) sensor is supported within the housing having a narrow field of view. The IR sensor is configured to generate thermal images of objects within the field of view having a first resolution which depends on the size of the IR sensor. A spatial information sensor supported within the housing is configured to determine a position for each of the thermal images generated by the IR sensor. A processing unit supported within the housing is configured to receive the thermal images and to combine the thermal images based on the determined positions of the thermal images to produce a combined thermal image having a second resolution that is greater than the first resolution.

According to another embodiment, a method for generating thermal images comprises providing a portable, handheld device including a low resolution IR sensor having a narrow field of view with the IR sensor being configured to generate thermal images of objects within the field of view having a first resolution. The device is moved, e.g., by an operator of the device, so that the field of view of the IR sensor is directed onto an area of interest. A plurality of thermal images of the area of interest is generated using the IR sensor as the device is being moved. A position for each of the thermal images is determined using a spatial information sensor in the portable, handheld device. The plurality of thermal images is then processed using a processor in the device based on the determined position of each of the thermal images to produce a combined thermal image such that the combined thermal image has a second resolution that is greater than the first resolution.

Figure 1:
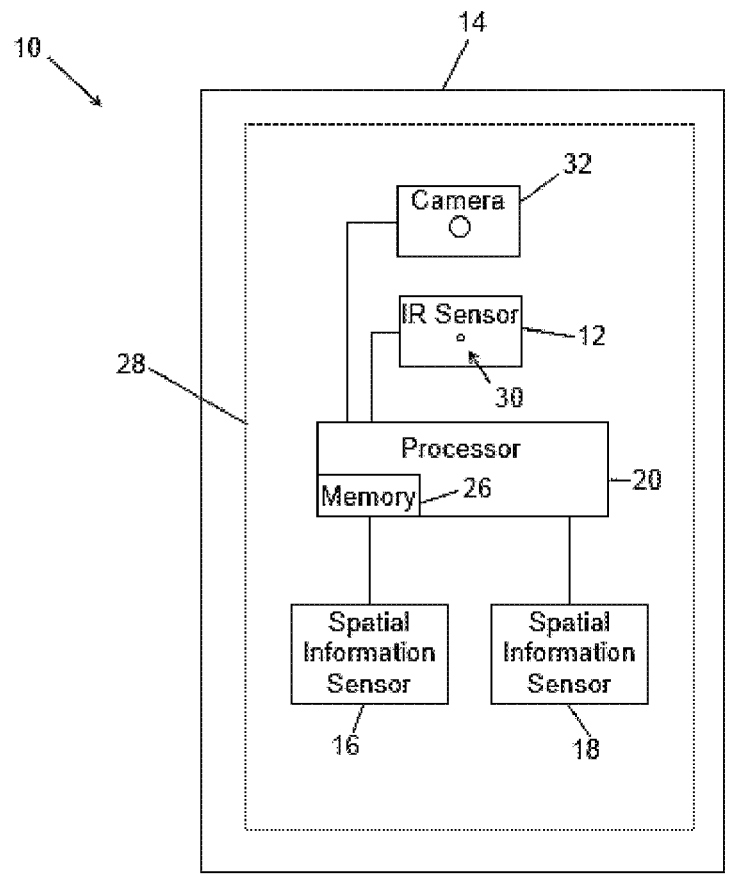
FIG. 1 is a block diagram of a handheld/mobile thermal imaging device in accordance with the present disclosure.

Referring to FIG. 1, a device 10 includes a housing 14, a low resolution IR sensor 12, spatial information sensors 16, 18 and a processing unit 20. The housing 14 comprises a small, portable device housing, such as smartphone housing, a tablet housing, a small camera housing, or other mobile device housing. The IR sensor 12 is configured to generate low resolution thermal images of objects within a field of view. The resolution of the thermal images is dependent upon the configuration of the IR sensor and the size of the field of view. The IR sensor 12 may be provided as a single pixel IR sensor having a single active element. Alternatively, the IR sensor 12 may comprise a small array of IR sensor pixels, such as a 2×2 array, a 3×3 array, or a 5×5 array. In one embodiment, the field of view of the IR sensor is 20 degrees or less, and, in one particular embodiment, is 10 degrees or less. In one embodiment, the IR sensor 12 is configured to generate thermal images at a rate that is greater than 1 Hz.

The IR sensor 12 may be implemented using resistive bolometers, diode based sensors, thermopile sensors, thermo/pyro-electric sensors, piezo-electric sensors, and/or other similar types of sensor devices. The IR sensor 12 does not require a lens. In one embodiment, the device 10 includes a pin-hole aperture 30, as are known in the art, defined in the housing 14, that serves as the focusing element for the IR sensor 12 rather than a lens. As an alternative, the device 10 may include a coded aperture, or similar type of aperture or opening, as are known in the art, for directing infrared radiation onto the IR sensor 12.

In the embodiment of FIG. 1, the device 10 includes a visible image sensor 32. Visible image sensors are often included in mobile handheld devices, such as smart phones and tablets, as cameras. The image sensor 32 may be implemented by charge coupled device (CCD) image sensors and/or complementary metal-oxide semiconductor (CMOS) image sensors. The sensor 32 may be activated to take images in any suitable manner, including user activation via hardware and/or software implemented controls as well as processor activation.

The spatial information sensors 16, 18 are configured to output signals indicative of the spatial, location, and/or position data for the thermal images generated by the IR sensor. In one embodiment, the spatial information sensors 16, 18 comprise inertial sensors, such as gyroscopes and/or accelerometers. Such inertial sensors are typically provided in mobile devices to detect device orientation and acceleration. The information from the inertial sensors 16, 18 alone may be sufficient to derive the spatial information. In some cases, spatial information can also be derived from other sensors provided in the device, such as visible range camera, range finder sensor, 3D imaging camera, and the like, and used in conjunction with or as an alternative to the inertial sensor data to derive the spatial information.

Figure 2:
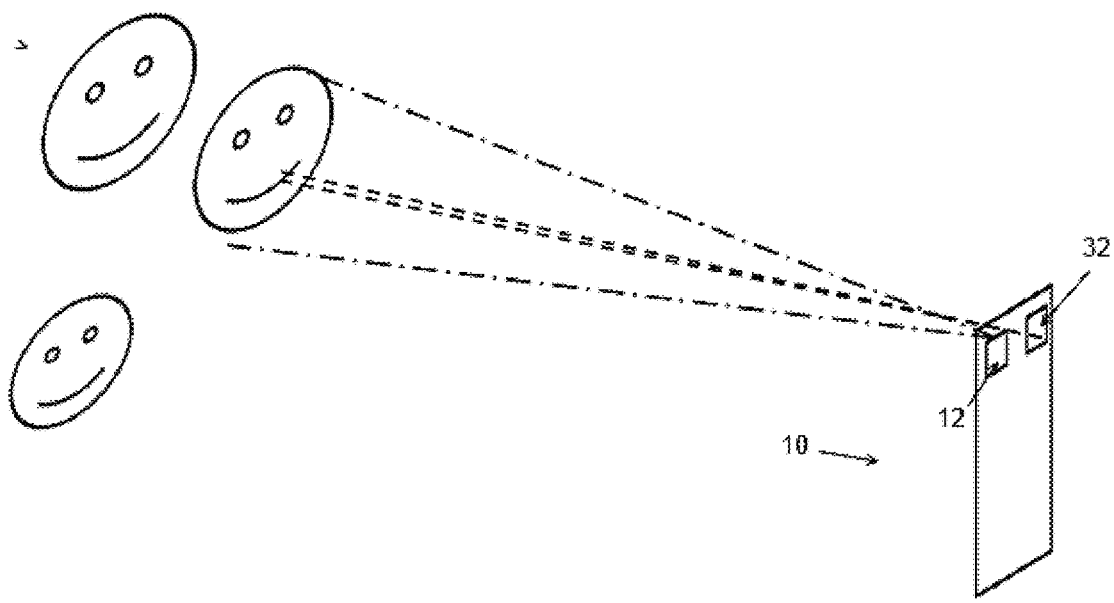
FIG. 2 is a schematic depiction of the device of FIG. 1 in use.
Figure 3:
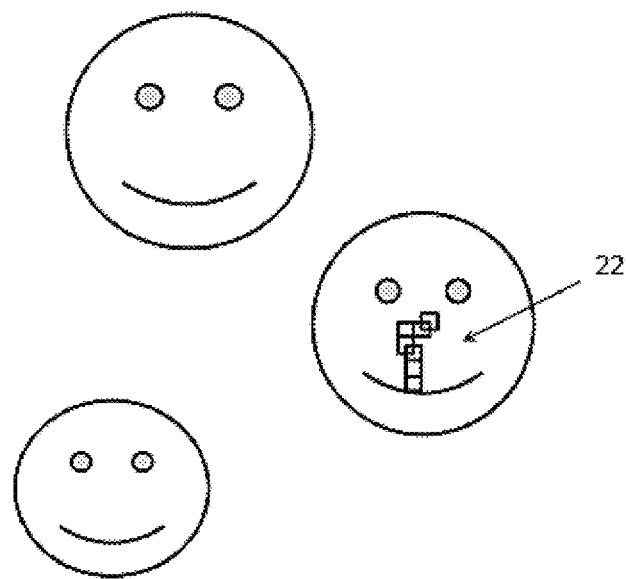
FIG. 3 depicts the arrangement of measured points from the example of FIG. 2.

In use, the device 10 is pointed toward an object or scene and thermal imaging is activated, e.g., through hardware and/or software controls provided in the device 10. The device 10 is then moved around to scan the IR sensor 12 over the areas of the object or scene to be thermally imaged, which in FIG. 2 corresponds to faces of people. As the device 10 is moved, the IR sensor 12 outputs signals at a high rate, e.g., greater than 1 Hz, that correspond to thermal images of smaller areas or points 22 within the field of view of the sensor 12. The thermal images indicate the temperature the points 22. FIG. 3 depicts the arrangement of the measured points 22 during the movement of the device 10. At the same time, the sensors 16, 18, 32 output signals that indicate the spatial, location, and/or position information pertaining to the measured points 22.

The thermal imaging output of the IR sensor 12 as well as the visible image output of the sensor 32 and the spatial, location, and/or position output of the sensors 16, 18 are received by the processing unit 20. The processing unit 20 may comprise a computing unit, such as a computer, microprocessor, or microcontroller, having a memory 26 suitable for storing programmed instructions and data used in calculations. The programmed instructions may include instructions for processing sensor output in accordance with various techniques and algorithms noted below. The processing unit 20 may also be operatively connected to a display 28 of the device and to render 2D, and in some cases 3D, thermal images on the display.

In one embodiment, the processing unit 20 is configured to estimate the movement of the device 10 from the output of one or more of the sensors 16, 18, 32 so the thermal images generated by the IR sensor can be registered with respect to each other to produce a combined thermal image having a higher resolution and covering a larger area than the individual thermal images generated by the IR sensor 12. The processing unit 20 may be configured to perform motion estimation and image registration in any suitable manner. For example, the spatial and movement information for the device 10 can be derived from the outputs of the inertial sensors 16, 18. The movement of the device 10 may be quantified based at least in part on image data from sensor 32 using techniques known in the art. For example, referring to FIG. 2, given the range of the scenes measured by the two sensors 12, 32, the two devices 12, 32 have overlap in their field of view which can be known and used to help quantify device movement using, for example, an optical flow measurement technique similar to what is used in super-resolution applications.

Figure 4:
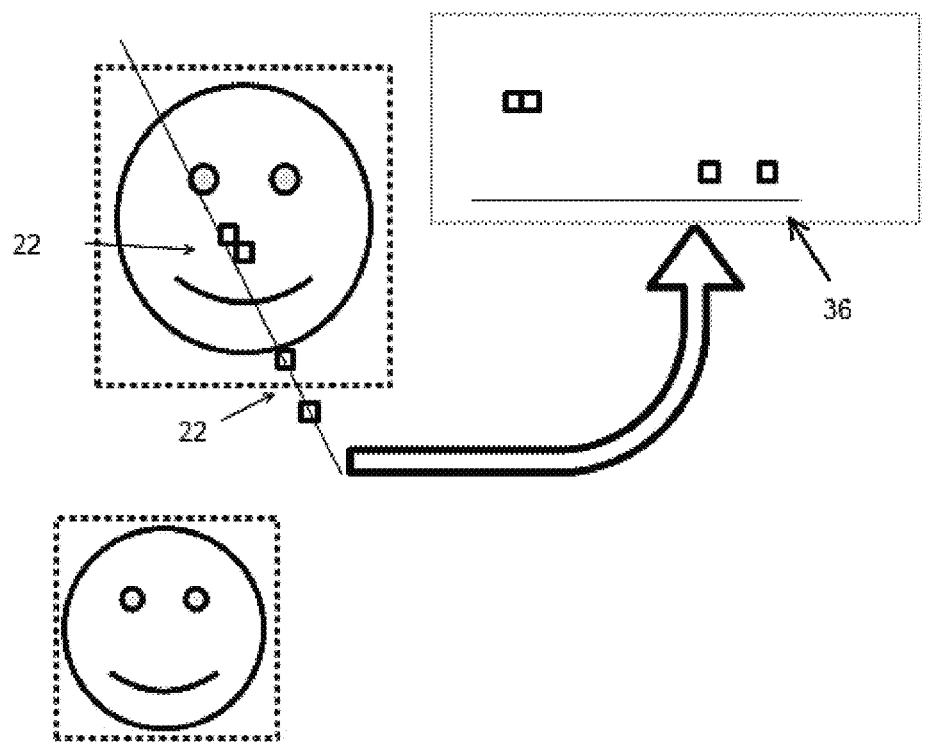
FIG. 4 depicts a scan path for generating a temperature gradient across an image of a face that can be used to better adjust the face estimation.

Referring to FIG. 4, the spatial information for the thermal imaging data is then used to map the thermal imaging data from the measured points 22 onto a larger area or space. For example, the spatial information can then be used to derive the coordinates of the measured objects 22 within a coordinate system 36, such as a three-dimensional (3D) coordinate system (e.g., xyz). The processing unit 20 may be configured to interpolate the coordinate values for the measured points 22 in any suitable manner, including linear and non-linear fashion techniques. Many of the algorithms for processing sensor output to generate the combined thermal image are established and can be found by referring to super-resolution and pixel de-mosaicking.

Using the techniques describe above, the resulting thermal image may have a resolution that is greater than 10×10 pixels and may cover an object area that is greater than 1×1 cm. Thus, the device and method in accordance with the present disclosure are capable of producing thermal images that have a much higher resolution than would otherwise be possible using a traditional IR camera with a single pixel, or small pixel array, imager. A low resolution IR sensor can be realized in a less than 2×2 mm$^2$ package which allows for easy incorporation into a small portable device housing, such as a smart phone. In addition, the low resolution IR sensor does not require an expensive lens to direct infrared radiation onto multiple pixels. To the contrary, a single pin-hole aperture may be used as a focusing element for the IR sensor. Thus, a device capable of producing high resolution thermal images in accordance with the present disclosure can be provided in much smaller sizes and at much less cost than traditional IR cameras.

The thermal information pertaining to points of an object or scene that is captured by the IR sensor can be used to provide other benefits in addition to thermal imaging. For example, if the device 10 has 3D imaging capability, the thermal information can be added to the x-y-z coordinates of the object or scene to produce a thermal 3D image or contour. Distance information from the 3D image data can also be used to update and validate the spatial information of the inertial sensors.

The thermal information can also be added to visual images as meta-data that can be used to enhance object detection and/or recognition in the visible camera output. As depicted in FIG. 4, a scan path across a scene that includes an image of a face results in a temperature gradient along the path of movement that can be used to better adjust the face estimation. The thermal information can also be used to help distinguish between an actual face and an image of a face (such as in a picture or poster). FIG. 5 depicts a schematic example of how the thermal data from the IR sensor can be fused with the visual imaging data to help distinguish facial features in an visual image.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for generating thermal images comprising:

moving a portable, handheld device along a scan path, the handheld device including a low resolution IR sensor and a visible image camera, the visible image sensor and the low resolution IR sensor having a field of view, the handheld device including a single pin-hole aperture as a sole focusing element for the low resolution IR sensor;

capturing images of the field of view with the visible image camera and thermal information of the field of view with the low resolution IR sensor as the device is moved;

processing the captured images and the thermal information to determine a temperature gradient for the area of interest along the scan path from the thermal images; and detecting and/or recognizing an object in the captured images based on the temperature gradient, wherein the low resolution IR sensor has a resolution in a range from a single pixel to a 5×5 array of pixels, and wherein the low resolution IR sensor has a field of view of 20° or less.

2. The method of claim 1, wherein detecting and/or recognizing an object further comprises:

determining whether the object detected in the captured images comprises a face based on the temperature gradient.

3. The method of claim 2, further comprising:

determining whether the face detected in the captured images is an actual face of an individual in the field of view or a two-dimensional image of a face in the field of view based on the temperature gradient.

* * * * *